(12) United States Patent
Günther et al.

(10) Patent No.: US 10,796,168 B2
(45) Date of Patent: Oct. 6, 2020

(54) DEVICE AND METHOD FOR THE CHARACTERIZATION OF OBJECTS

(71) Applicant: VOLKSWAGEN AKTIENGESELLSCHAFT, Wolfsburg (DE)

(72) Inventors: Hendrik-Jörn Günther, Hannover (DE); Bernd Rech, Bokensdorf (DE); Sandra Kleinau, Rötgesbüttel (DE); Bernd Lehmann, Wolfsburg (DE); Stefan Gläser, Braunschweig (DE); Monique Engel, Braunschweig (DE); Teodor Buburuzan, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 3 days.

(21) Appl. No.: 15/763,131

(22) PCT Filed: Aug. 2, 2016

(86) PCT No.: PCT/EP2016/068438
§ 371 (c)(1),
(2) Date: Mar. 26, 2018

(87) PCT Pub. No.: WO2017/054965
PCT Pub. Date: Apr. 6, 2017

(65) Prior Publication Data
US 2018/0285658 A1    Oct. 4, 2018

(30) Foreign Application Priority Data

Sep. 29, 2015  (DE) .................. 10 2015 012 475
Mar. 29, 2016  (DE) .................. 10 2016 205 139

(51) Int. Cl.
*G06K 9/00* (2006.01)
*G08G 1/16* (2006.01)
(Continued)

(52) U.S. Cl.
CPC ..... *G06K 9/00791* (2013.01); *G06K 9/00201* (2013.01); *G08G 1/161* (2013.01);
(Continued)

(58) Field of Classification Search
None
See application file for complete search history.

(56) References Cited

U.S. PATENT DOCUMENTS 8,594,920 B2  11/2013 Shida
8,831,869 B2   9/2014 Bai et al.
(Continued)

FOREIGN PATENT DOCUMENTS

CN    102077259 A    5/2011
CN    102834852 A   12/2012
(Continued)

OTHER PUBLICATIONS

Search Report for International Patent Application No. PCT/EP2016/068438, Oct. 27, 2016.
(Continued)

*Primary Examiner* — Matthew C Bella
*Assistant Examiner* — Brian D Shin
(74) *Attorney, Agent, or Firm* — Barnes & Thornburg LLP

(57) ABSTRACT

A device and method for characterizing objects to be identified by acquiring sensor data, which includes a first source of sensor information and a second source of sensor information. The method includes determining at least one object to be identified based on the sensor data. The method and the device also include selecting the sensor information from the
(Continued)

first source which is assigned to the object to be identified. The method also includes characterizing the object to be identified by information based on the selected sensor information from the first source.

17 Claims, 8 Drawing Sheets

(51) Int. Cl.
  *H04W 4/38* (2018.01)
  *H04W 4/44* (2018.01)
(52) U.S. Cl.
  CPC ............ *G08G 1/163* (2013.01); *G08G 1/164* (2013.01); *G08G 1/165* (2013.01); *G08G 1/166* (2013.01); *H04W 4/38* (2018.02); *H04W 4/44* (2018.02)

(56) References Cited

U.S. PATENT DOCUMENTS 9,269,264 B2    2/2016  Shimizu et al.
2013/0128284 A1*  5/2013  Steffey ................. G01B 11/002
                                                356/623
2014/0081507 A1*  3/2014  Urmson ................ B60W 40/06
                                                701/28
2014/0195138 A1*  7/2014  Stelzig ................. G08G 1/0116
                                                701/119

FOREIGN PATENT DOCUMENTS

| | | |
|---|---|---|
| CN | 104217615 A | 12/2014 |
| DE | 102011077998 A1 | 1/2012 |
| DE | 102010038640 A1 | 2/2012 |
| DE | 102011107111 A1 | 1/2013 |
| DE | 102012205299 A1 | 10/2013 |
| DE | 102012210059 A1 | 12/2013 |
| DE | 102012210344 A1 | 12/2013 |
| DE | 102012219637 A1 | 4/2014 |
| DE | 102014200279 A1 | 7/2015 |

OTHER PUBLICATIONS

Search Report for Chinese Patent Application No. 2016800569255; Jun. 3, 2020.
Search Report for German Patent Application No. 10 2016 205 139.3; dated Jun. 5, 2018.

* cited by examiner

| | Signal name | Optional | Signal length [Bit] | Min raw value [deg] | Max raw value [deg] | Phys. value [deg] | Unit | Offset | Scale | Raw value | Description | Comment |
|---|---|---|---|---|---|---|---|---|---|---|---|---|
| TS 102 894-2 V1.2.1 [2014-09] A.114 | ITS PDU Header | | | | | | | | | | | Adaptation for EPM |
| | protocolVersion | | 8 | | | | | | | | | |
| | messageID | | 8 | | | | | | | | denm(1) cam(2) poi(3) spat(4) map(5) ivi(6) ev-rsr(7) epm(255) | Add epm(255) field |
| A.77 | stationID | | 32 | 0 | 4.29E+09 | 0.. 4294967295 | - | 0 | 1 | | Identifier for ITS-S | Station ID of originating vehicle; same as used for any other message type |
| DF SUMMARY | Length / Bits max | | 48 | | | | | | | | | |
| | Length / Bytes max | | 6 | | | | | | | | | |
| | Originating Vehicle Information | | | | | | | | | | | |
| | generationDeltaTime | | 16 | 0 | 65535 | 0..65535 | | | | | | Time corresponding to the time of the reference position in the EPM, considered as time of the CAM generation. Value shall be wrapped to 65536. |
| A.124 | ReferencePosition | | | | | | | | | | | |
| A.41 | latitude | | 31 | -9E+08 | 9E+08 | -90.0000000..90.0000001 | degree | 0 | 1.00E-07 | | | |
| A.44 | longitude | | 32 | -1.8E+09 | 1.8E+09 | -180.0000000..180.0000001 | degree | 0 | 1.00E-07 | | | |
| A.119 | positionConfidenceEllipse | | | | | | | | | | | |
| A.67 | semiMajorConfidence | | 12 | 0 | 4095 | | | | 1.00E-02 | | | |
| A.67 | semiMinorConfidence | | 12 | 0 | 4095 | | | | 1.00E-02 | | | |

FIG. 8a

| | | | | | | | | |
|---|---|---|---|---|---|---|---|---|
| A.35 | semiMajorOrientation | 12 | 0 | 3601 | | | 1.00E-01 | |
| A.9 | altitudeValue | 20 | -100000 | 800001 | -1000.00..8000.00 | m | 1.00E-02 | |
| | altitudeConfidence | 4 | 0 | 15 | | | | |
| A.8 | Heading | | | | | | | |
| A.112 | headingValue | 12 | 0 | 3601 | 0..360.0 | degree | 0 | 1.00E-01 | Assumed Heading of vehicle |
| A.35 | headingConfidence | 7 | 1 | 127 | | degree | 0 | | see standard |
| A.34 | speedX | | | | | | 0 | | |
| | speedValue | 15 | -16383 | 16383 | -163.83..163.83 | m/s | | 1.00E-02 | |
| | speedConfidence | 7 | 1 | 127 | | m/s | | | |
| | speed_y | | | | | | | | |
| | speedValue | 15 | -16383 | 16383 | -163.83..163.83 | m/s | | 1.00E-02 | |
| | speedConfidence | 7 | 1 | 127 | | m/s | | | |
| A.131 | VehicleLength | | | | | | | 1.00E-01 | |
| A.92 | VehicleLengthValue | 10 | 1 | 1023 | 1..1023 | m | | | |
| A.91 | VehicleLengthConfidenceIndication | 3 | 0 | 4 | 0..0.4 | | | | |
| A.95 | VehicleWidth | 6 | 1 | 62 | 1..1.62 | m | | 0.1 | |
| DF | Length / Bits max | 221 | | | | | | | |
| SUMMARY | Length / Bytes max | 27.625 | 27.625 | | | | | | |
| | Field of View information | x | | | | | | | |
| | sensorID | 8 | 0 | 255 | | | | | Maximum number to be determined; do not send frequently |
| | sensorType | 4 | 0 | 15 | | | | | 0 - undefined<br>1 - radar<br>2 - lidar<br>3 - monovideo<br>4 - stereovision<br>5 - nightvision<br>6 - ultrasonic<br>7 - fused object<br>8 - pmd |
| | sensorPosition_x | 8 | -100 | 101 | -10.0..10.0 | m | 0 | 1.00E-01 | |
| | sensorPosition_y | 8 | -100 | 101 | -10.0..10.0 | m | 0 | 1.00E-01 | |
| | radius | 13 | 0 | 4096 | 0..409.6 | m | 0 | 1.00E-01 | |

FIG. 8b

| | | Length / Bits max | 67 | | | | | | |
|---|---|---|---|---|---|---|---|---|---|
| DF SUMMARY | | Length / Bytes max | 8.375 | | | | | | |
| | beginAngle | 13 | -3600 | 3601 | -360.1..360.0 | degree | 0 | 1,00E-01 | |
| | endAngle | 13 | -3600 | 3601 | -360.1..360.0 | degree | 0 | 1,00E-01 | |
| | Dynamic Objects | 67 | | | | | | | |
| | | 8.375 | x | | | | | | Maximum number to be determined |
| | timeOfMeasurement | 14 | 0 | 15100 | | ms | 0 | 1,00E-01 | Time difference of the measurement to the provided reference time. 0 = unavailable |
| | objectID | 8 | 0 | 255 | | | | | ID of object; will remain the same as long as object is |
| | sensorID | 8 | 0 | 255 | | | | | 0 = unavailable |
| | distX | | | | | | | | |
| | distanceValue | 16 | -32768 | 32767 | -327.68.. 327.67 | m | 0 | 1,00E-02 | relative distance from EPM sender in DIN70000 x-direction |
| | distanceAccuracy | 16 | -32768 | 32767 | -327.68.. 327.67 | m | 0 | 1,00E-02 | |
| | distY | | | | | | | | |
| | distanceValue | 16 | -32768 | 32767 | -327.68.. 327.67 | m | 0 | 1,00E-02 | relative distance from EPM sender in DIN70000 y-direction |
| | distanceAccuracy | 16 | -32768 | 32767 | -327.68.. 327.67 | m | 0 | 1,00E-02 | |
| | objectHeading | | | | | | | | |
| A.35 | headingValue | 12 | 0 | 3601 | 0..360.0 | degree | 0 | 1,00E-01 | Assumed Heading of vehicle |
| A.24 | headingConfidence | 7 | 1 | 127 | | degree | 0 | 1,00E-01 | see standard |
| | speedX | | | | | | | | |
| | speedValue | 15 | -16383 | 16383 | -163.83.. 163.83 | m/s | 0 | 1,00E-02 | |
| | speedConfidence | 7 | 1 | 127 | | m/s | 0 | 1,00E-02 | |
| | speedY | | | | | | | | |
| | speedValue | 15 | -16383 | 16383 | -163.83.. 163.83 | m/s | 0 | 1,00E-02 | |

FIG. 8c

| Code | Field | | | | | Units | Confidence | Notes |
|---|---|---|---|---|---|---|---|---|
| A.115 | speedConfidence | x | 7 | | 127 | m/s | 1.00E-02 | |
| A.45 | longitudinalAcceleration | x | 9 | -160 | 161 | m/s^2 | 1.00E-01 | |
| A.1 | accelerationConfidence | x | 7 | 0 | 102 | m/s^2 | 1.00E-01 | 102 if data unavailable |
| A.115 | lateralAccelerationValue | x | 9 | -160 | 161 | m/s^2 | 1.00E-01 | |
| A.1 | lateralAccelerationConfidence | x | 7 | 0 | 102 | m/s^2 | 1.00E-01 | 102 if data unavailable |
| | ObjectLength | x | | | | | | |
| | lengthDimensionValue | x | 10 | 0 | 1023 | m | 1.00E-01 | |
| | LengthDimensionAccuracy | x | 7 | 0 | 100 | m | 1.00E-100 | |
| | ObjectWidth | x | | | | | | |
| | widthDimensionValue | x | 6 | 0 | 62 | m | 1.00E-01 | |
| | widthDimensionAccuracy | x | 7 | 0 | 100 | m | 1.00E-100 | |
| A.78 | ObjectType | x | 8 | 0 | 255 | | | 0 – unknown<br>1 – pedestrian<br>2 – cyclist<br>3 – moped<br>4 – motorcycle<br>5 – passengerCar<br>6 – bus<br>7 – lightTruck<br>8 – heavytruck<br>9 – trailer<br>10 – specialVehicle<br>11 – tram<br>15 – RSU |

FIG. 8d

DEVICE AND METHOD FOR THE CHARACTERIZATION OF OBJECTS

PRIORITY CLAIM

This patent application is a U.S. National Phase of International Patent Application No. PCT/EP2016/068438, filed 2 Aug. 2016, which claims priority to German Patent Application Nos. 10 2015 012 475.7, filed 29 Sep. 2015, and 10 2016 205 139.3, filed 29 Mar. 2016, the disclosures of which are incorporated herein by reference in their entireties.

SUMMARY

Exemplary embodiments relate generally to the recognition and characterization of objects in an environment of a transportation vehicle.

BRIEF DESCRIPTION OF THE DRAWINGS

Exemplary embodiments are explained in greater detail below with reference to the accompanying figures, in which:

FIGS. 8a-d show an example of a detailed structure of the data field.

DETAILED DESCRIPTION

Figure 1:
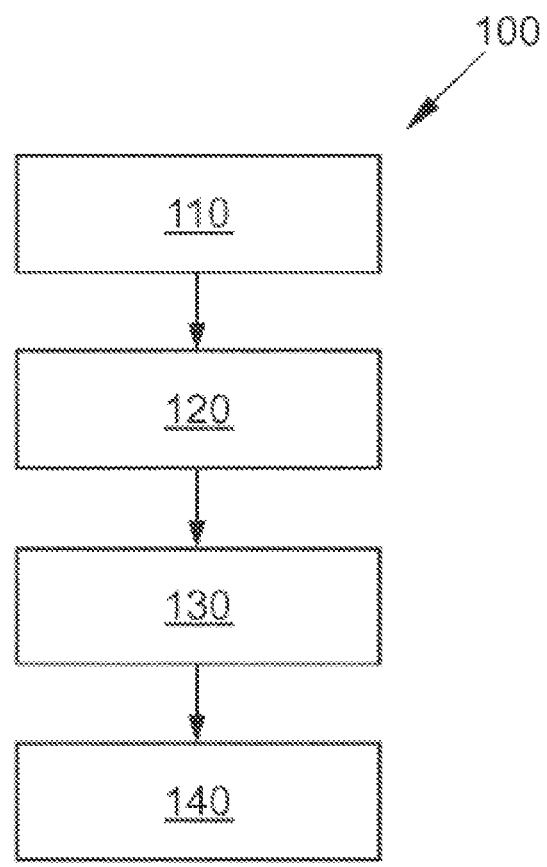
FIG. 1 shows a disclosed method.

The introduction of V2X technology (V2X stands for Vehicle to X, where X can stand for transportation vehicle or else infrastructure, for example) allows a fundamental extension of the detection range of a transportation vehicle to include objects located outside the line-of-sight of the transportation vehicle sensors. The technology, which is based on the active exchange of information, also allows communication of information that cannot be obtained by the local sensors. As part of the standardization work of ETSI (European Telecommunications Standards Institute), message contents have already been defined for the European market that facilitate a description of a road user in the environmental model using transportation vehicle status messages (what is known as the Cooperative Awareness Message (CAM)) or implement a dedicated warning of hazardous situations (known as the Decentralized Environmental Notification Message (DENM)). One challenge in the introduction of the V2X technology is achieving a minimum number of communication partners, referred to as the critical mass, necessary for market acceptance.

The existing standards for the ETSI ITS-G5 reference architecture already take into account the aforementioned CAM and DENM information, which is confined to the properties of the sending transportation vehicle. Information about transportation vehicles without the V2X communication can only be acquired using the sensors of the ego transportation vehicle, which can result in a less complete object assessment.

It would therefore be desirable to improve the object assessment in relation to transportation vehicles without their own V2X communication.

This is addressed by the disclosed device and method.

A first exemplary embodiment provides characterization of objects to be identified. This comprises acquiring sensor data comprising a first source of sensor information and a second source of sensor information. The method also comprises determining on the basis of the sensor data at least one object to be identified. The method also comprises selecting that sensor information from the first source that is associated with the object to be identified. The method further comprises characterizing, using information based on the selected sensor information from the first source, the object to be identified.

Thus determining an object to be identified can be based on sensor data from a plurality of sources, whereas characterizing the identified objects can be restricted to one source. For example, the first source may be the ego transportation vehicle having sensors of known quality. Recognized objects can accordingly be characterized using sensor information of known quality, which results in improved input data for downstream functions such as a transportation vehicle control system, for example.

It is thereby possible to improve the assessment in relation to transportation vehicles without their own V2X communication.

Characterization is used in the sense of ascribing certain attributes to objects to be identified. For instance, characterization can be performed by the data from sensors that describe the environment of a transportation vehicle. Thus, for example, the radar signal, the lidar signal (lidar=light detection and ranging), the camera signal etc. from the ego transportation vehicle can be used to characterize another transportation vehicle.

Objects to be identified are all objects, persons and transportation vehicles located in the transportation vehicle environment. They are categorized and, for example, classified as a transportation vehicle, a person or a building. The objects can also be identified more precisely in different degrees of detail. For instance, the aforementioned CAM information recognizes transportation vehicle classes, mass, position and dynamic behavior of the transportation vehicle, which can be used for more precise identification of the object.

Sensor data is acquired using suitable electronic components. Known sensors for detecting objects in the transportation vehicle environment are based, for example, on technologies such as radar, lidar (light detection and ranging), cameras etc. During operation, these sensors supply data, which is acquired, stored and evaluated by the connected electronic components. A huge range of data rates, data content and time intervals can be expected from the various sensors here. It is hence necessary to prepare the various sensor data for common processing.

According to the exemplary embodiments, different sources of sensor information can be used for identifying objects. Thus in-transportation vehicle sensors can be considered to be a first source. A second source can be sensors of another transportation vehicle. In this case, the same type of sensors or different sensors may be present in the first source and the second source. Thus, for instance, both sources may be equipped with radar sensors. Alternatively, the sources may also comprise different sensor types. The second source can also comprise sensor information from a plurality of transportation vehicles. In addition, the second source can also comprise data from fixed installations, which may be an infrastructure, for example. Even fixed installations can transmit sensor information that relates to sensor types being used in the ego transportation vehicle, for instance, radar sensors.

Determining on the basis of the sensor data at least one object to be identified can be performed in various ways. For instance, a hierarchical model can be used in which a data cloud containing all the sensor data is used as a basis. In a first operation, fragments of objects, for instance, parts of an arm, torso or head, are then identified from the data in the data cloud. In a second operation, an attempt is then made to connect the fragments into subobjects, i.e., into arms, a torso or a head. Then in the third operation the actual object recognition takes place, which in the given example identifies the object as a person. This object, augmented by further data describing the object, is then provided to subsequent devices such as a transportation vehicle control system. In this process, the sensor raw data can also be modified in the course of the object recognition.

Selecting that sensor information from the first source that is associated with the object to be identified can be performed on the basis of numerical association. For instance, sensor information from the first source can be stored in a database in numbered form, for example. If an object is identified from this and usually other information, the object can contain references to the original sensor information, for instance, as a reference to the numbering. Thus the associated sensor information can accordingly be assigned to the recognized objects, which sensor information can also be distinguished by source.

Characterizing the object to be identified, which characterization uses information based on the selected sensor information from the first source, for example, can be performed by adding the selected sensor information to the object data. Alternatively or additionally, an address or numbering added to the object data can also point to the selected sensor information. This sensor information can correspond to the sensor raw data, which, unlike the sensor data used to determine the objects, constitutes an unaltered image of the transportation vehicle environment.

It is hence possible for the characterization to take a plurality of forms.

It is thereby possible to improve, for example, the object assessment in relation to transportation vehicles without their own V2X communication.

The first source of sensor information can optionally be a local sensor of a transportation vehicle and provide sensor raw data. The second source of sensor information can be a remote sensor and provide sensor messages via an interface. The local sensor can detect the environment of the transportation vehicle, and the remote sensor can detect the status of at least one additional transportation vehicle and/or detect the environment of the at least one additional transportation vehicle. The status detection can be embodied here as a Cooperative Awareness Message (CAM) and/or as a Decentralized Environmental Notification Message (DENM).

Local sensors of a transportation vehicle are mounted on and in the transportation vehicle itself. Typical examples of the local sensors are radar, lidar and camera sensors. These are arranged so as to detect the environment of the transportation vehicle. In this case, the environment can extend up to 200 meters around the transportation vehicle. Typical mounting positions are in the bodywork and fenders of transportation vehicles. Optionally, also more than one sensor of the same type are installed, for instance, to detect the environment lying in front of and behind the transportation vehicle.

These local sensors supply data, which is also referred to below as raw data or sensor raw data. This sensor raw data is specific to sensor type and model and differs in terms of data volume and data rate, amongst other parameters. Downstream electronics receive the data from the sensors and can arrange it, for example, in a data cloud and then prepare it for subsequent applications. These can include driver assistance systems, which use the recognized objects for transportation vehicle control, for example.

Remote sensors are sensors of other road users or of the infrastructure. The data from the remote sensors can be transmitted via an interface of mobile ad-hoc networks, for instance, embodied in accordance with an ETSI (European Telecommunications Standards Institute) ITS-G5 (Intelligent Transport System) reference architecture. The sensor messages provided can in this case comprise data from sensors that are also being used locally on the transportation vehicle and detect the transportation vehicle environment and/or the environment of the infrastructure. In addition, the sensor messages can also comprise messages that include the current status or the use of a transportation vehicle. For this purpose, sensors can be used that detect the number of occupants, the speed of the transportation vehicle, the mass of the transportation vehicle and other parameters. This can also include data stored in memories and include specific operating states such as emergency driving with blue light and siren.

Interfaces are not limited to standardized interfaces, for instance, based on ETSI. Thus non-standardized interfaces can also be used, which may have a manufacturer-specific design, for example. Additional sensor information can thereby be received that contains comfort functions or even more extensive information that is not contained, for example, in the ETSI standard.

Sensor information on the status of a transportation vehicle can include the distance from the transportation vehicle in front and from the transportation vehicle behind. It can also contain the average speed and the mass and geometry of the transportation vehicle. In addition, a "transportation vehicle in emergency operation" signal, for instance, from the police or fire service, can be included in the sensor information on the status of a transportation vehicle. Thus generally the sensor information on the status of a transportation vehicle is not limited to unprocessed sensor information; a status of a transportation vehicle can also contain pre-processed sensor information. Furthermore, hazard warnings can also be included. It is thereby possible to warn of black ice, a storm or fog, of drivers travelling against traffic, crossing a red light and similar hazards.

Sensor information on the status of a transportation vehicle can also be embodied as a Cooperative Awareness Message (CAM) and/or as a Decentralized Environmental Notification Message (DENM). These are standardized by ETSI in the standard documents EN 302 637-2, for instance, in version V1.3.1, and ETSI EN 302 637-3, for instance, in version V1.2.1, V1.2.2 and V1.3.2. Using the standards ensures extensive compatibility between transportation vehicles from different manufacturers.

The characterization of the object to be identified can thereby be made more precise by virtue of a multiplicity of external additional information.

In some disclosed embodiments, determining the object to be identified can also be based on fused data in addition to the sensor data associated with the identified object, which fused data is based on a combination of sensor raw data from a multiplicity of sensors. In addition, the sensor data and the fused data can use circular buffers for storing values for different acquisition times.

Associating sensor data with objects is an essential function of object recognition. As already outlined above, this association can be performed in a multi-operation process, in which sensor data from, for example, a data cloud of the sensor data, is first identified as fragments of objects, which in further operations are augmented into subobjects and finally into objects. It is hence possible to associate sensor data with objects. In addition, objects are identified using fused sensor information. For example, forms of the various sensor types that are typical of objects are linked to one another to recognize, for instance, typical motion sequences and other object specifics. In this case, it is also possible to use computational methods to augment missing properties to deduce objects. Sensor information can also be processed by a Kalman filter. In other words, Kalman filters help to smooth out interference caused by the sensors, with the result from the filters then being stored as fused sensor information. The combined or fused data is likewise stored in association with the objects.

A probability of existence of recognized objects essentially depends on continuous recognition of the object by the associated sensors. In addition, sensor information becomes obsolete relatively quickly, whether it be because an object leaves the area being observed or because it changes in this area. Thus circular buffers are suitable, in which successive items of sensor information can be stored for each sensor relating to the object. The n+1 item of sensor information overwrites the oldest entry; the n+2 item of sensor information overwrites the second oldest entry, and so on. These buffers can have different sizes and designs depending on the sensor. They can have the same time base across each of the sensors.

It is thereby possible to improve the object recognition of objects.

Additional information based on the sensor data and on the fused data can optionally be provided with the identified objects.

Data that is based on sensor data and on fused data can be embodied, for example, as processed sensor data and fused data. As already outlined, this data can be modified in the course of the object recognition and hence differs from the sensor raw data. In addition, this data can also originate from remote sensors and hence significantly increase the data pool. Moreover, the objects can be ascribed a multiplicity of further attributes. Possible examples are a parameter for the probability of existence, a scheduled time for deletion of the object (time out) and the reference of the data with respect to a local or global coordinate system.

Thus for the recognized objects, more complete information that has been checked for plausibility can be provided for further processing.

In some disclosed embodiments, a data field can be received via a mobile network. This data field can comprise a description field, which comprises an identifier of t transportation he vehicle and/or a position of the transportation vehicle and/or a distance of the transportation vehicle and/or a speed of the transportation vehicle and/or an acceleration of the transportation vehicle and/or at least one property of the local sensors of the transportation vehicle. The data field can also comprise a dynamic object container, which in turn comprises the description of at least one dynamic object. In addition, the data field can comprise a static object container, which comprises the description of at least one static object.

A data field can be embodied as a concatenation of structure elements having defined meanings. Such data fields are typical in data exchange between machine entities and have a detailed specification and moreover are often standardized as well. For transmission, such data fields are often provided with additional redundancy and also encoded in a manner suited to the transmission medium. They usually start with a header, which identifies the data field and may also contain additional information.

In addition, the data field can comprise a description field, in which general information that applies to the subsequent fields can be placed. In the present case, the information can be information that specifies the transportation vehicle from which the data field originates, and the properties of this transportation vehicle.

Thus, for instance, the description field can contain an identifier of the transportation vehicle, and can contain information on manufacturer, transportation vehicle type, date of manufacture, equipment features etc.

In addition, the field can contain the position of the transportation vehicle. This may be referred to a global coordinate system, for example, and include details of length and width. It can also be referred to the World Geodetic System 1984 (WGS 84), for example, which as a geodetic reference system provides a standardized basis for position data on the Earth and in near-Earth space. Other reference systems are also possible.

In addition, one or more distances from objects in the environment of the sending transportation vehicle can be specified in the description field. This can also comprise the distance to the receiving transportation vehicle, so that the local estimate of the distance can be checked. The distances can be designated with respect to all the reported objects of the sending transportation vehicle, which objects can be positioned at all points of the compass.

In addition, the speed of the sending transportation vehicle can also be specified. Once again in this case, figures may be in different dimensional units (kilometers per hour, miles per hour), which may also be contained jointly.

In addition, the acceleration of the transportation vehicle can be given. This can comprise both the longitudinal acceleration and the lateral acceleration and includes the corresponding decelerations of the transportation vehicle. Speed and acceleration can also be transmitted for a certain elapsed time, to reveal a variation over a specific time period.

A variety of this and/or also other data can also be transmitted in standardized form, for example, in the aforementioned CAM and DENM information, as standardized in ETSI. This data can also be disposed in the description field. In addition, parameters of the local sensors of the sending transportation vehicle can also be transmitted. This can relate to the arrangement of the sensors on the transportation vehicle and/or to the properties of the sensors used. Thus range, detection angle, resolution and other parameters can be transmitted for each sensor type. If different sensors of the same type (for example, radar) are used, for instance, to detect the front, side and rear space around the transportation vehicle, these associated parameters can also be transmitted. In addition, performance classes of the sensor types may be known, which likewise can be transmitted.

Data on dynamic objects that the sending transportation vehicle has recognized using its sensors is transmitted in the dynamic object containers. This may be other road users sharing the road space with the sending transportation vehicle and the receiving transportation vehicle. This may be motor transportation vehicles of almost any form, cyclists and pedestrians, animals and objects moving on or beside the road, in intersection areas or in other road situations.

This data from the local sensors of the sending transportation vehicle can comprise sensors that are the same type or a different type with regard to the receiving transportation vehicle. Thus, for instance, radar, lidar and infrared technologies can be used in both transportation vehicles for detecting the transportation vehicle environment. In addition, this data can be transmitted as sensor raw data and hence the receiving transportation vehicle can use this data, unprocessed by the sending transportation vehicle, for object recognition. In this case, the local object formation using fused data can have recourse to still unmodified sensor raw data from the sending transportation vehicle, and thus errors arising from data that has already been altered can be avoided.

It can also be transmitted in processed form, however, and comprise already recognized objects in the environment of the sending transportation vehicle, in which case the sensor raw data may already be modified for this. Alternatively, sensor raw data and object data containing modified sensor data can also be transmitted. In the early stage of V2X communication, which is also referred to as C2X (Car-to-X, where X stands for the widest range of mechanisms, which include transportation vehicles (C2C, Car-to-Car), infrastructure (C2I, Car-to-Infrastructure) and others), with few transportation vehicles having this technology, it is thereby possible to improve the recognition and assessment of transportation vehicles without V2X.

In addition, a maximum number of objects can be described in the dynamic (and also in the static) object container.

In general, a restriction may also be made in the transmission of the data detected by the local sensors of the sending transportation vehicle. The selection can be restricted to data that is associated with objects recognized in the sending transportation vehicle. The recognition of such objects can in turn in the sending transportation vehicle also involve data that was received by the sending transportation vehicle as part of V2X communication. In this situation, although data received from third-party transportation vehicles, for example, may not be transferred, it is used for the object recognition. In this case, for example, only the sensor raw data from the local sensors of the sending transportation vehicle, insofar as this data is associated with objects, is transmitted.

Furthermore, the data to be sent can also depend on the probability of existence of the identified object. This probability of existence is a standard parameter in object recognition systems and expresses how likely the system holds the existence of this object. Thus, for instance, data is transmitted only for those objects which, on the basis of the degree of probability of their existence, would also invoke in the sending transportation vehicle a response of a local driver assistance system.

Data on static objects is transmitted in the static object container. This can be done in a similar way to dynamic objects.

In the early stage of V2X communication with few transportation vehicles having this technology, it is thereby possible to improve the recognition and assessment of transportation vehicles without V2X function. This is the case if only sensor raw data is transmitted, because this data represents the unaltered perception of the environment.

Optionally, the dynamic object container can comprise at least one dynamic object. The latter in turn comprises sensor information from the first source and/or localization information, which contains a local or a global reference value, and/or dynamics information for describing the object dynamics and/or a classification of the object and/or an estimated geometric dimension of the object. The static object container can comprise at least one static object. This in turn comprises sensor information from the first source and/or localization information and/or a classification of the object and/or an estimated geometric dimension of the object or an occupancy grid of a detection area.

One dynamic object description is arranged in the dynamic object container for each transmitted dynamic object. The same applies to the static objects. This dynamic object description can contain sensor information on the sensor(s) and the associated sensor raw data. The sensor information can contain specific sensor properties such as resolution, range, sensor generation etc. It can also contain specific localization information on the sensor such as a specific detection angle or a specific position or a specific horizontal or vertical orientation of the sensor in or on the transportation vehicle. In addition, the sensor raw data can comprise localization information referred to the sending transportation vehicle. Alternatively, the sensor data can also be referred to a global reference system, which may be embodied, for instance, in accordance with ETSI TS 102 894-2, which uses as its reference the aforementioned WGS-84 reference model (World Geodetic System 1984).

Dynamic information on the objects can comprise all the details that also characterize the transportation vehicles monitoring the environment and, for instance, can be transmitted as a CAM message or DENM message. Hence it can also comprise estimates of the speed of the object, its acceleration or deceleration, its mass and other parameters listed in the cited ETSI standard that contain dynamic information on the objects.

The objects can be classified, for example, in accordance with ETSI TS 102 894-2 (Intelligent Transport Systems (ITS); Users and applications requirements; Part 2: Application and facilities layer common data dictionary), for instance, as specified in version 1.2.1. This standard recognizes, for instance, the message management and application usage classes. In addition, subclasses are also recognized, which can be used for object classification.

Estimated geometric dimensions of the object can be given as a length, width and thickness or else as points, straight lines, planes, distances and/or angles, or in mixed parameters. In this context they can define shapes and/or describe finer structures of the observed object. It is also possible, for instance, to add geometric classes for differently dimensioned multitrack transportation vehicles, single-track transportation vehicles, pedestrians, structures (for example, bridges, traffic guidance infrastructure such as crash barriers).

Static objects in the static object container can have a similar structure to dynamic objects and hence comprise the parameters explained for the dynamic objects. The principle of the occupancy grid can be used for the geometric description instead of, or in addition to, the described geometric shapes. In this case, the area being surveyed, also referred to as the detection area, is divided into small segments, and for each X, Y, Z position, the probability of "something" or "nothing" being there is noted. This can be applied to areas considered in two dimensions or three dimensions.

A further exemplary embodiment provides a device for characterizing objects to be identified. This device comprises sensor-data acquisition components for acquiring sensor data comprising a first source of sensor information and a second source of sensor information. The device also comprises determination components for determining on the basis of the sensor data at least one object to be identified. In addition, the device comprises selection components for selecting that sensor information from the first source that is associated with the object to be identified. The device also comprises interfaces for providing the object to be identified and information based on the selected sensor information from the first source.

A sensor-data acquisition component can process a variety of sensor data. This may be the raw sensor data from directly connected sensors arranged locally on the transportation vehicle. In this case, the ego transportation vehicle can count as a first source. Disclosed embodiments of the connected sensors can comprise various sensor types such as radar, camera and lidar. It is also possible for a plurality of sensors of the same type to be connected, which detect, for instance, different spatial segments in the transportation vehicle environment. This varied sensor data can differ significantly in terms of transmission speed, data volume and clock speed.

Additional sensor data can be received from a second source, which is located outside the ego transportation vehicle. This second source is not limited to another transportation vehicle, however, but can include sensor data from different transportation vehicles and also from infrastructure. This sensor data from the second source can be received, for example, via the V2X interface in the transportation vehicle, which can also describe the status of sending transportation vehicles. Known parameter sets for the status description are the CAM data and DENM data, which have already been introduced above.

In addition, it is also possible to receive via the V2X interface sensor data on the local environment originating from transportation vehicles or infrastructure looking at the travel situation or environmental situation, so, for instance, regarding the road. This data may comprise the sensor raw data from the remote sensors, for instance. It is also possible here to receive only that sensor raw data that can be associated with objects recognized by the sender. In this case, the object recognition by the sender can also take into account the probability of existence of the recognized objects in selecting the sensor data to be sent. In addition to, or instead of, the sensor raw data mentioned, the sensor data from the local environment of the sender can also comprise object information that is comparable to the locally generated object data from the device described here or from the method described above. This object data can hence also comprise a probability of existence, a predicted time length of existence of the object, altered sensor data and also fused data.

The sensor-data acquisition component can receive this data, if applicable pre-process the data, and provide this data, for example, in a data cloud or in evaluation structures arranged according to sensor type and/or according to sources, for further processing.

Determination components are used to determine, on the basis of the sensor data, objects to be identified. The determination components may comprise a sensor raw data database, in which the received sensor data is saved in unaltered and identifiable form. This can be done independently of the receive source and also independently of status information or environmental information of received sensor data. In addition, the sensor data can be converted into a common data format. The sensor data can also be assigned to a common coordinate system, where at least a local and a global reference system are available. This sensor data, modified in this or even other ways, can be saved in a second database and is likewise identifiable. Then the data, converted into a data format and/or localized in the coordinate system, can be fed to a processing unit, which performs the object recognition. For example, in this process, the sensor data is fused with already recognized objects, or new objects are determined, which likewise can be saved in another database. Objects without up-to-date sensor data can be deleted after a predetermined time. Objects can also be merged if more recent sensor data suggests this. The determination components can also provide an association matrix, which is used for associating objects, altered and fused sensor data and sensor raw data.

Selection components can access the various databases and assign associated sensor raw data, for example, to the recognized objects. Alternatively or additionally, selection components can also assign to the recognized objects even altered sensor data and fused sensor data that has been used to identify the objects and/or to alter object attributes. For this purpose, the selection components can also make use of the association matrix provided by the determination components.

Interfaces for providing the object to be identified and information based on the selected sensor information from the first source, provide data for further processing in downstream transportation vehicle systems, which may be embodied as processor systems. The interfaces can be equipped with memory elements for storing the data to be provided. In this case, data can be made available that assigns associated sensor raw data to recognized objects. This may be limited to locally generated sensor raw data to prevent corruption of the ego sensor raw data with sensor raw data from other transportation vehicles. On the other hand, however, all available data can be used to identify and parameterize the associated objects.

Additionally or alternatively, further data can be provided that comprises the altered sensor data and/or fused sensor data. This data can also be associated with the recognized objects.

The interfaces can be embodied here as a connection unit to the subsequent processing units, where the connection unit can be coupled to an in-vehicle bus system. It can also be implemented as a plug-in connection or other type of connection between the device and the subsequent systems. The interfaces can also be embodied as connections on a printed circuit board between components that are associated with the described device on the one side and with the subsequent systems on the other.

Optionally, disclosed embodiments can comprise determination components that are designed to process the sensor data, which involves synchronizing the sensor data and/or determining objects and/or combining sensor data.

The synchronization of sensor data can be used for allocating the sensor data to specific processing segments. The processing segments evaluate the available data in a specific time segment. This evaluation also includes the object determination for this time segment and the processes mentioned of altering and combining the sensor data. A processing segment typically has a time length of 200 milliseconds, although shorter and longer time lengths can also be implemented.

The combining of the sensor data as part of the object formation seeks sensor data suitable for potential objects or objects already identified in previous processing segments. This sensor data is associated with the objects as additional data. Alternatively, sensor data fused from various sensor data can also be formed, which then is associated with the object as a fused sensor dataset. If sensor data cannot be associated with any potential or identified object, a new potential object can be created. In this case, recognized or potential objects can be assumed to exist for a predetermined time length. In addition, a sensor data association matrix can be generated for subsequent further associations.

In exemplary embodiments, the selection components can comprise a first database for storing the sensor raw data and/or comprise a second database for storing the objects to be identified.

Databases are suitable for managing information in which large volumes of data need to be stored efficiently, consistently and permanently, and required subsets need to be provided in different, needs-based representations for application programs. It is possible here that a database for storing the sensor raw data is connected to a database of the identified objects in such a way that it is possible to associate sensor raw data with the objects by, for instance, common association data in both databases.

Optionally, exemplary embodiments can comprise transportation vehicles having a device as described above.

The transportation vehicles can include all known forms of transportation vehicles, i.e., heavy goods transportation vehicle in all possible sizes, buses for transporting people, automobiles, motorbikes and mopeds. These can be equipped with combustion engines and/or electric drive, with the latter drawing its electrical power from a battery and/or from hydrogen.

Various exemplary embodiments are now described in greater detail with reference to the accompanying drawings, which show some exemplary embodiments. In the figures, the thickness dimensions of lines, layers and/or regions may be shown exaggerated for the sake of clarity.

In the following description of the accompanying figures, which show only some exemplary embodiments, the same reference signs can denote the same or comparable components. In addition, collective reference signs can be used for components and objects that arise more than once in an exemplary embodiment or in a drawing but can be described jointly with regard to one or more features. Components or objects that are described by the same or collective reference signs, in terms of one or more or all features, for instance, their dimensions, may be identical in design but also, if applicable, may also have a different design unless inferred otherwise, explicitly or implicitly, from the description.

FIG. 1 shows a method 100 for characterizing objects to be identified. In this method, acquisition of sensor data comprising a first source of sensor information and a second source of sensor information is performed in a first operation at 110. In the next operation at 120, at least one object to be identified is determined on the basis of the sensor data. In the following operation at 130, that sensor information from the first source that is associated with the object to be identified is selected. In the operation at 140, the object to be identified is then characterized using information based on the selected sensor information from the first source.

Figure 2:
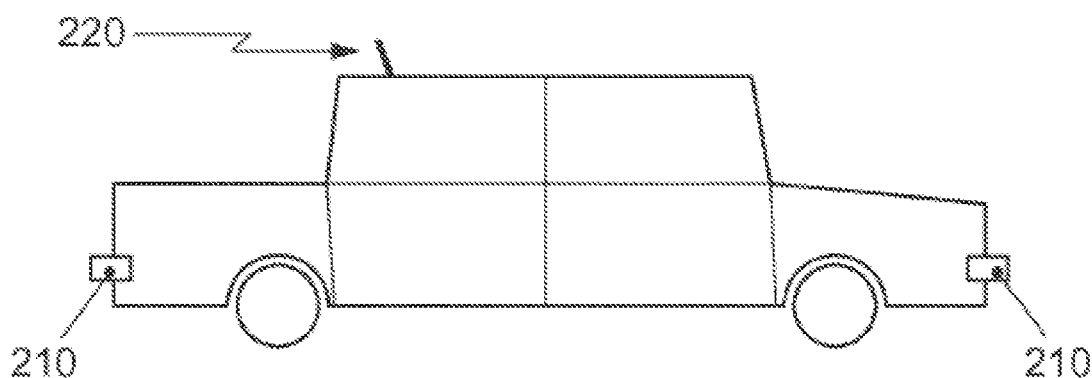
FIG. 2 shows a transportation vehicle in which local sensors are arranged, and sensor information from a second source.

FIG. 2 shows local sensors 210, which are arranged by way of example on a transportation vehicle and provide sensor raw data as sensor information. In addition, the transportation vehicle receives sensor information from remote sensors 220. The local sensors detect the environment of the transportation vehicle. The sensor information from the remote sensors covers the status of other transportation vehicles and/or environments of transportation vehicles or infrastructure.

Figure 3:
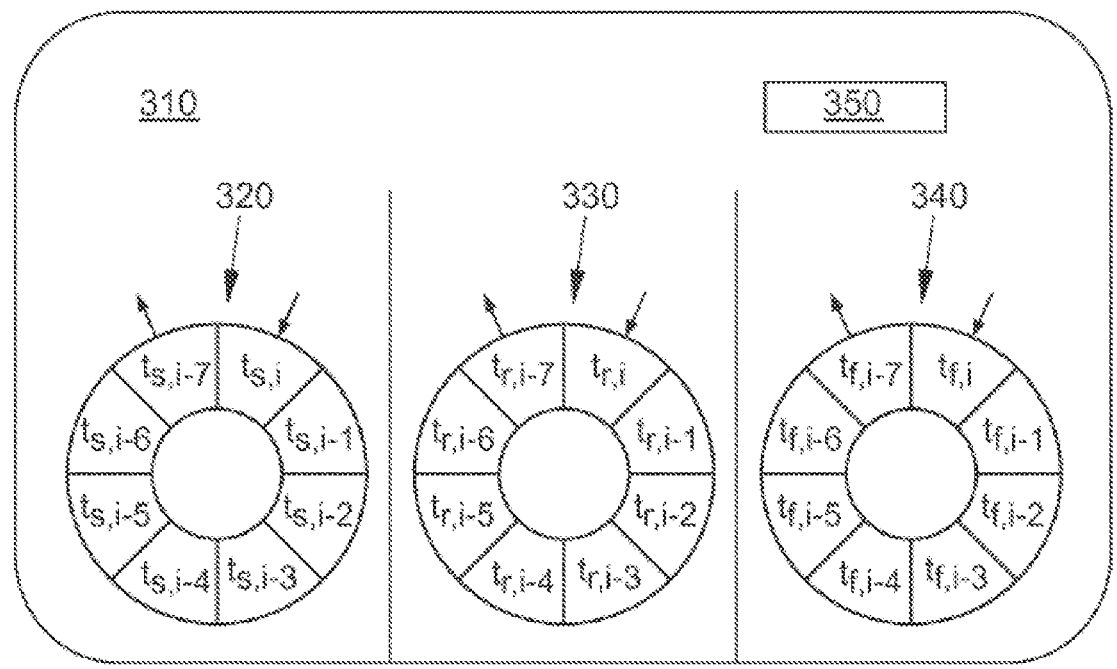
FIG. 3 shows a structure of an object.

FIG. 3 shows an object structure 310, which can be created for each identified object. This figure shows sensor data 320 and 330 associated with the object. It also shows fused data 340, which is based on sensor data and is likewise associated with the object. All the data 320, 330 340 is gathered at different successive time instants and stored in a circular buffer in each case. In the example shown, the eighth entry in the circular buffer overwrites the oldest entry, with the result that the most recent eight entries are always available. Additional data 350 is also associated with the object. This data can comprise the probability of existence, the scheduled object lifetime (time out) and further object-related data.

Figure 4:
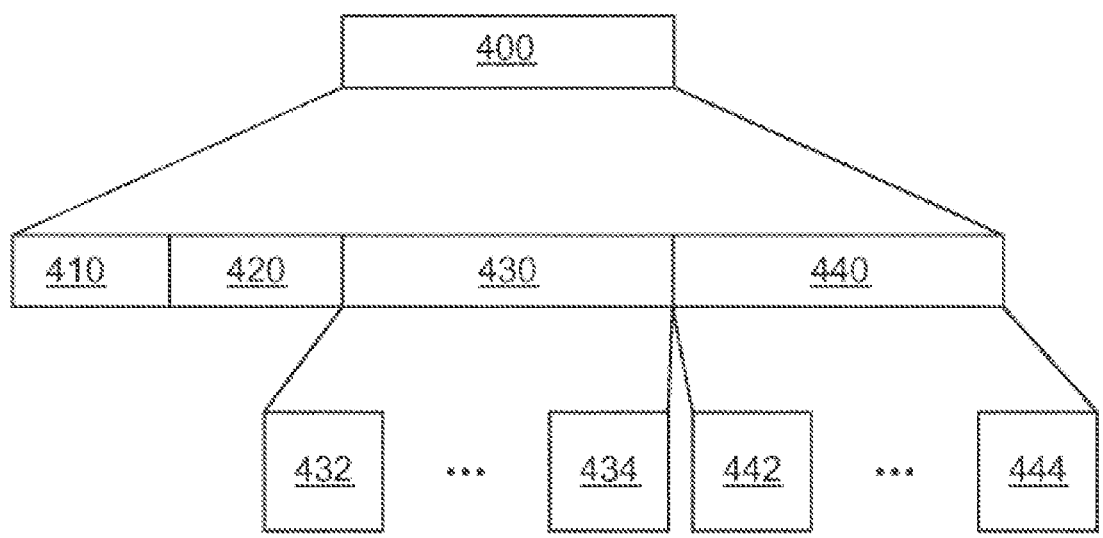
FIG. 4 shows a structure of a data field.

FIG. 4 shows a data field 400, which can be received via an air interface. This data field 400 contains data from the transportation vehicle environment of remote transportation vehicles or from infrastructure. It is taken into account in the local object recognition. The data field 400 here comprises a header 410, which can be a standard ITS-S (Intelligent Transport System station), for example, in accordance with ETSI TS 102 894-2. It is used to identify the data field 400. Next can be arranged a description field 420, which can comprise an identifier of the sending transportation vehicle and/or a position of the transportation vehicle and/or a distance of the transportation vehicle and/or a speed of the transportation vehicle and/or an acceleration of the transportation vehicle and/or at least one property of the local sensors of the transportation vehicle. The dynamic objects can be transmitted in the dynamic object container 430 that follows. The static objects can be transmitted in the subsequent static object container 440. A dynamic object 432, 434 can comprise sensor information from the first source and/or localization information containing a local or global reference value and/or dynamic information for describing the object dynamics and/or a classification of the object and/or an estimated geometric dimensions of the object. A static object 442, 444 can comprise sensor information from the first source and/or localization information and/or a classification of the object and/or an estimated geometric dimension of the object or an occupancy grid of a detection area.

Figure 5:
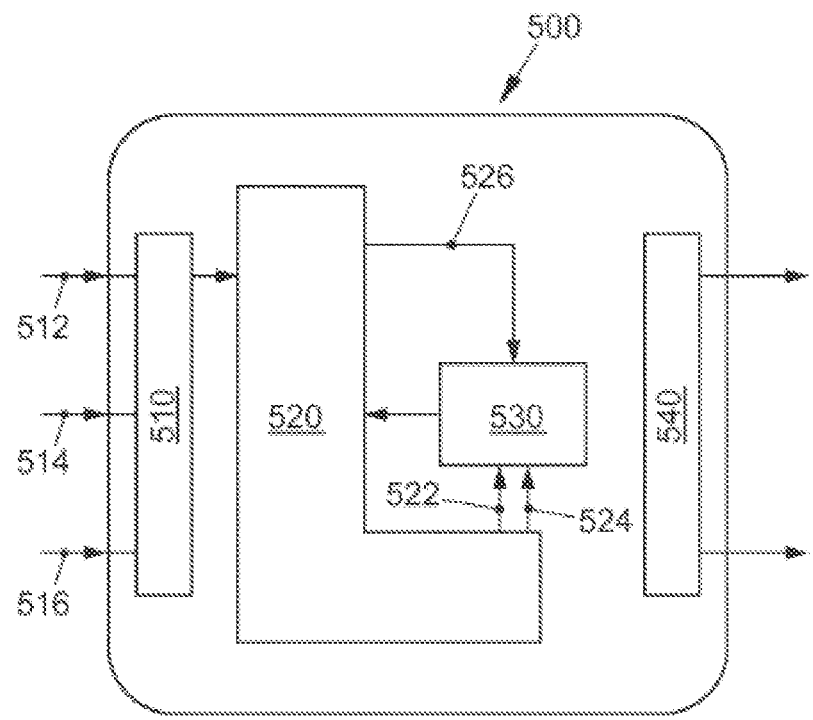
FIG. 5 shows a block diagram of a disclosed device.

FIG. 5 shows a device 500 for characterizing objects to be identified. The device 500 comprises sensor-data acquisition components 510 for acquiring sensor data comprising a first source 512 of sensor information and a second source 514, 516 of sensor information. In this case, the first source 512 is the sensor information from the sensor data belonging to the transportation vehicle, and the second source is sensor information from other transportation vehicles or from infrastructure. The sensor data is transferred to determination components 520 for determining on the basis of the sensor data at least one object to be identified. The determination components 520 also comprise an object database. Then data from an association matrix 522 and fused objects 524 are fed to selection components 530 for selecting that sensor information from the first source that is associated with the object to be identified. For this purpose, the selection components receive from the determination components 520 sensor information from the first source 526. The object database of the determination components 520 is updated by the selection components 530 to associate fused objects with existing objects. Then data is provided to the interface 540 for providing the object to be identified and information based on the selected sensor information from the first source.

Figure 6:
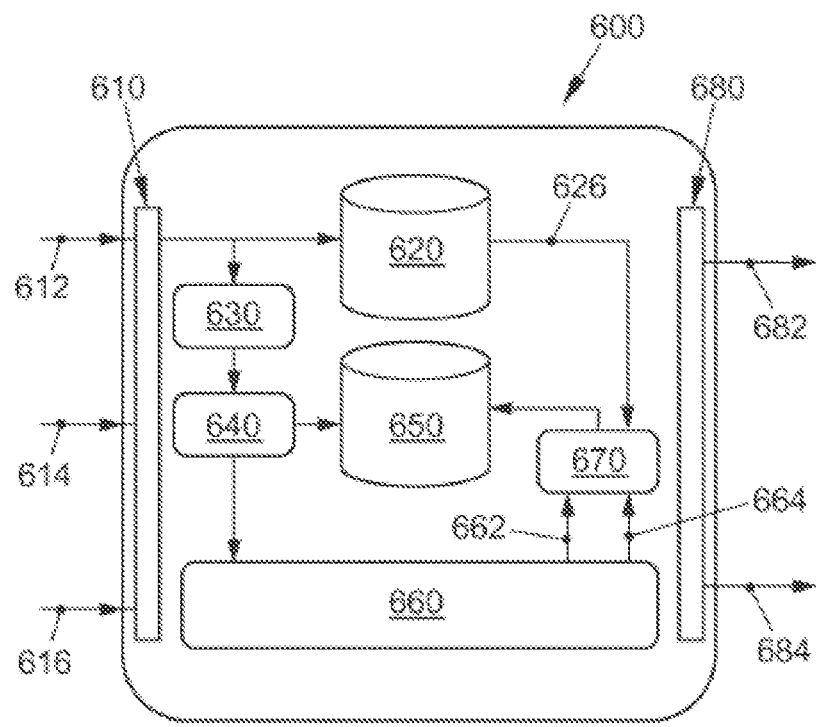
FIG. 6 shows a more detailed block diagram of the disclosed device.

FIG. 6 shows the device in greater detail. In this figure, the sensor data 612-616 corresponds to the sensor data 512-516. The sensor-data acquisition components 610 transfer the sensor data to a database containing sensor raw data 620 and to a data format module 630, in which a common data format is produced for the sensor data. This data reaches the object relativization unit 640, which produces a local reference system for all the data. Then the data modified in this way is saved in the object database 650 and in the modular environmental representation framework 660. The latter then provides an association matrix 662 and recognized objects 664 to the data fusion module 670, which is also supplied with sensor information from the first source (sensor raw data) 626. The data fusion module 670 supplies existing objects to the object database 650 for the purpose of associating fused objects. There is hence a link between recognized objects and local sensor raw data. The objects 684 to be identified and information based on the selected sensor information from the first source 682 are then provided by an interface 680 for further processing by subsequent systems.

Figure 7:
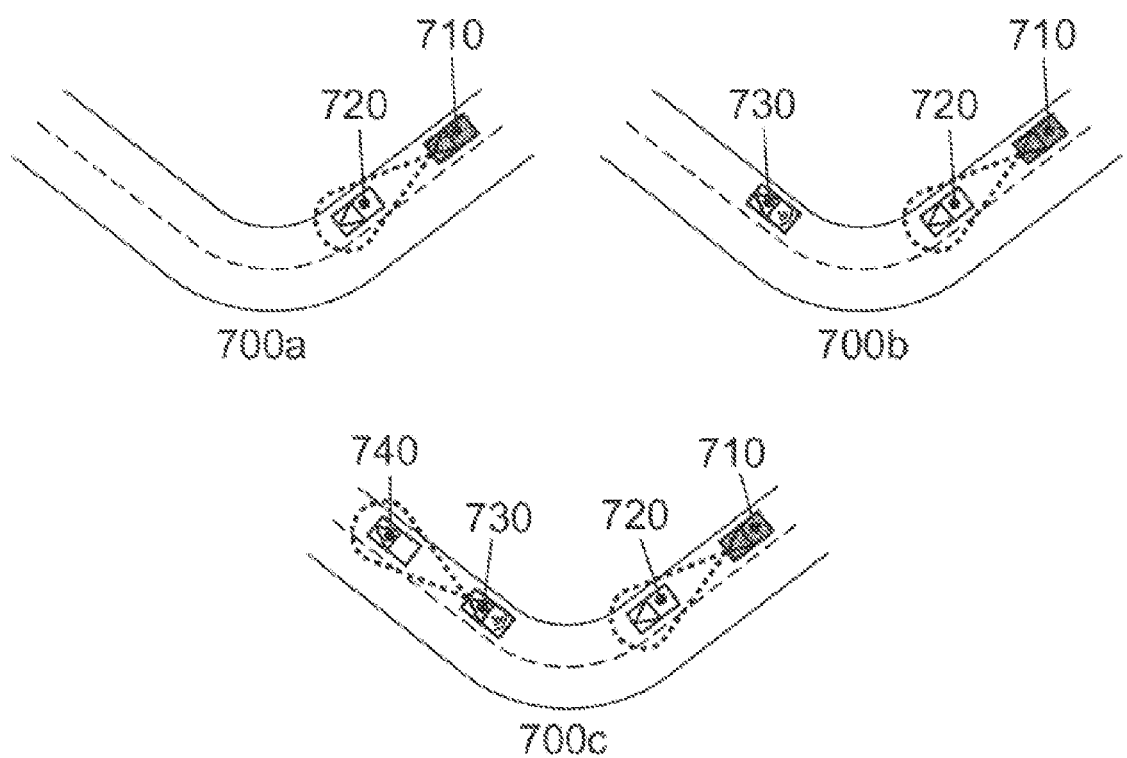
FIG. 7 shows various traffic situations with and without V2X communication.

FIG. 7 is described in connection with the following summary.

FIG. 8*a-d* show an example of a detailed structure of a data field for V2X communication containing a multiplicity of parameters. It is constructed in accordance with ETSI TS 894-2, V1.2.1 (2014-09). The data field starts with a header (A.114, ITS PDU header) containing general information and the message identifier and transportation vehicle/infrastructure identifier (A.77).

The information on the sending transportation vehicle optionally follows as the next field. (Originating Vehicle Information—A.95). In exemplary embodiments, this comprises its position (A.124, Reference Position), its heading or point of the compass (A.112, Heading), its speed (speedX—speed confidence) and its length and width (A.131-A95, VehicleLength—VehicleWidth).

Fields containing sensor descriptions (sensorID—endAngle) optionally come next, in which the relevant sensors and their design are described. This is shown for one sensor by way of example.

Optionally follows the field of the dynamic objects (Dynamic Objects—A.78, ObjectType), which can have a similar structure to the field containing the information for the sending transportation vehicle. The field optionally also comprises time information (timeOfMeasurement), which indicates the time difference between measuring and sending the data. Exemplary embodiments also include a field for specifying the determined object type (A.78, ObjectType), which comprises the standard types of road user.

A field for static objects can also follow (not shown), in which infrastructure is described, for example.

The top of FIG. 8*a* shows the structure of the various parameters in greater detail. They can comprise, per parameter, the signal name, field width, physical and logical values of the parameters. Individual parameter values can be limited to ranges or values. It is thereby possible to ensure their compatibility when exchanged with other transportation vehicles or infrastructure.

The features disclosed in the above description, the following claims and the accompanying figures, both individually and in any combination, can be relevant to, and implemented for, the realization of an exemplary embodiment in its various forms.

Although some embodiments have been described in connection with a device, it shall be understood that these embodiments also constitute a description of the corresponding method, and therefore a block or a component of a device shall also be understood as a corresponding method operation or as a feature of a method operation. Similarly, embodiments that have been described in connection with, or as, a method operation, also constitute a description of a corresponding block or detail or feature of a corresponding device.

A programmable hardware component, which can be implemented as a sensor data receiver, as a determination component, as a selection component or as an interface, can be formed by a processor, a central processing unit (CPU), a graphics processing unit (GPU), a computer, a computer system, an application specific integrated circuit (ASIC), an integrated circuit (IC), a system on chip (SOC), a programmable logic element or a field programmable gate array (FPGA) containing a microprocessor.

The exemplary embodiments described above merely represent an illustration of the principles of the present disclosure. It is evident that modifications and variations to the arrangements and details described here are obvious to other persons skilled in the art. It is therefore intended that the disclosure is limited only by the scope of protection of the claims below and not by the specific details that have been presented in this document using the description and explanation of the exemplary embodiments.

The disclosure can be summarized as follows:

The exemplary embodiments disclose identification of objects in the transportation vehicle environment, for which objects, object determination makes use of ego transportation vehicle sensors and other transportation vehicle sensors, whereas the characterization of the recognized objects is based on the ego sensor data.

Most of today's driver assistance systems relate to local sensors. With the introduction of vehicle-to-X (V2X) communication, the awareness limit of the next generation of transportation vehicles will be further extended. Since the technology is based on the presence of other communications partners (network effect), every measure should be taken to increase market penetration. Exemplary embodiments introduce a concept of collective perception, which is aimed at recognizing objects detected using local perception sensors, as an addition to the declared self-disclosure procedures of the transportation vehicles operating V2X.

Current standardization efforts for V2X communication are aimed at the disclosure of transportation vehicles in the network. Thus transportation vehicles equipped with V2X are able to be aware of one another beyond line-of-sight, and hence are capable of increasing the awareness limit of each transportation vehicle. Since self-disclosing transportation vehicles (i.e., transportation vehicles using V2X) use their internal sensor system (for instance, the accelerometer, etc.), the exchange of information includes more comprehensive information about the dynamic status of the transportation vehicles than when measurements are performed by another transportation vehicle using its local perception sensors (for instance, radar, camera, etc.). The drawback of this technology, as for any communications technology based on a network presence, is what is known as the network effect: a minimum of users, called the critical mass, is needed for measurable gains when using this technology.

Exemplary embodiments are based on the fundamental idea of employing local perception sensors in transportation vehicles using V2X to improve virtually the penetration rate of this technology through additional dissemination of data from the local perception sensors perceived by the transportation vehicles and belonging to the transportation vehicles using V2X. During the introduction of V2X communication to the market, when only a small number of transportation vehicles are V2X-compatible, the principle of virtual perception can lead to an increasing rate of acceptance of V2X technology.

With the introduction of V2X technology and the existing measures announced, many driver assistance systems can be improved because the perception range of the transportation vehicles is significantly improved. This allows the exchange of information that is difficult to obtain with standard environmental perception sensors, for instance, information such as the role of the transportation vehicle in the traffic (for instance, an emergency transportation vehicle), the number of passengers and the mass and geometric dimensions of the transportation vehicle. The periodically sent general perception messages (Cooperative Awareness Messages (CAM)) contain for this purpose information about the position and the dynamic status of the transmitting transportation vehicle. CAM has been standardized in ETSI EN 302 637-2 V1.3.1 or V1.3.2. Warnings and information about hazards can be transmitted via decentralized environmental notification messages (DENM), which can also use dedicated routing algorithms (for example, multi-hop and targeted geographic transmission) to achieve prioritized dissemination. DENM has been standardized in ETSI EN 302 637-3 V1.2.1.

Exchanging sensor information between users on the road allows further expansion of the field of view of the V2X-compatible transportation vehicles, because they will perceive other transportation vehicles inside the range and also the objects that these transportation vehicles locally perceive. FIG. 7, 700a shows the objects (transportation vehicles) 720 within the perception range of the local sensors for the ego transportation vehicle 710. Its perception range is limited to the present lines of sight of the sensors. With the introduction of V2X technology, the perception is extended beyond the line of sight, and the ego transportation vehicle 710 becomes aware of other transportation vehicles 730, as shown in FIG. 7, 700b. In implementing the principle of collective perception, the ego transportation vehicle gains additional knowledge about transportation vehicles 740 not equipped with V2X within the awareness limits of transportation vehicles equipped with V2X, as shown in FIG. 700, 700c.

The more objects that the ego transportation vehicle is aware of, the better the ego transportation vehicle understands its environment. In situations in which penetration rate is low, the exchange of locally perceived objects between V2X-compatible transportation vehicles allows the development of a new driver assistance system. Moreover, existing systems are improved. For instance, the extended field of view of the transportation vehicle can be used to extend the area of use of a blind-spot recognition systems to unclear field-of-view situations such as those of a curve. In addition, the ego transportation vehicle is made aware of intersecting transportation vehicles provided other V2X transportation vehicles have a line of sight into the connected roads of an intersection.

The basis of local perception systems is an environmental model of the objects in the vicinity of the transportation vehicle. The environmental model works as a data pool for all the objects that the transportation vehicle can perceive, regardless of the receive source. Whenever a new measurement (measured values from a perception sensor) is performed, this measurement is either fused with the existing objects in the environmental model or a new object is created. Each object in the data pool exists only for a limited time. Whenever an object in the environmental model has not been perceived again within a predetermined time by the perceiving transportation vehicle, the object is removed.

The environmental model holding the V2X objects comprises a Modular Environmental Representation Framework (MERF) 660. This is responsible for processing all the sensor raw data. Its main function is to synchronize all the measurements, predict objects in its data pool and fuse sensor data. FIG. 6 shows the basic architecture of the environmental model and its interfaces to transportation vehicle functions. The environmental model 600 receives sensor raw data from the local perception sensors, the CAM and DENM from the V2X interface and also an environmental perception message (EPM), details of which are given later. The data is saved in the sensor raw data data pool/database 620 for later use. In addition, the sensor raw data is packaged in a common format in the packaging module 630. Depending on the input data, the measurements must be referenced to a local coordinate system of the transportation vehicle, which is performed in the object relativization module 640. After this module, all the measurements are referenced to the same local coordinate system and can hence be saved in the object data pool/database module 650, which keeps all the known objects of the transportation vehicle.

In addition, the objects are transmitted to the modular Environmental Representation Framework MERF 660, which performs the synchronization of all the measurements and the potential data-fusion with existing objects. For this purpose, MERF monitors the objects for a limited time span. After the fusion operation, an association matrix 662 and the fused objects 664 are fed back to the data fusion module 670. This module is responsible for re-assigning fused objects to the existing objects in the object data pool/database 650. The environmental model provides two interfaces for transportation vehicle functions. The interface for fused objects allows the selection of the fused sensor data for further processing in functions of driver assistance systems. The interface for associated, unprocessed measurement data allows the association of the sensor raw data with the fused sensor objects from the sensor raw data data pool/database 620 for further processing.

Each object of the object data pool/database 650 of the environmental model describes the temporal-spatial attributes of a perceived object. For this purpose, each object in the data pool/database 650 consists of a (circular) buffer for each sensor type $\sigma$ containing measurements $t\sigma,i$ for the objects at a specific time i, as shown in FIG. 3. The size of each buffer can be varied according to the properties of the associated sensor. In addition to the buffers 320, 330 assigned to the sensor, a further buffer stores the fused objects 340. The data fusion module 670 has access to this buffer to assign the fused sensor data 342 to the object in the object data pool/database 650.

An Environmental Perception Message (EPM) forms the heart of the principle of collective perception. FIG. 4 shows the basic structure of the message and recommends for use some data fields in the message. The purpose of the EPM is to establish a mechanism for publishing information about the locally perceived objects in the mobile ad-hoc network. The standard ITS PDU (Protocol Data Unit) header from ETSI TS 102 894-2 is intended to be used, as defined in ETSI 102 894-2, to comply with the existing standards.

The description field 420 contains information about the sending ITS station of the EPM. This information consists of data fields such as station identity (ID), distance, speed, acceleration, etc. This data field can be used by the receiving ITS station to associate an EPM with the objects of the environmental model. In addition, this information is redundant to the information that has been transmitted already using CAM. This increases the update rate of the data of the ITS station and thus improves the quality of the data prediction and of the fusion process. In addition, the container also contains information about the local sensor properties (for instance, range and beam angle, as specified by the sensor manufacturer) of the sending ITS station.

The dynamic object container 430 contains information about the perceived dynamics (for instance, the movement) of objects that have been detected by the local perception sensors of the sending ITS station. The description of the dynamic objects is based on the sensor raw data, which is stored in the sensor raw data data pool/database 620; see FIG. 6. This method reduces the propagation of errors when using objects that have already been fused.

The selection of the (dynamic and static) objects is transmitted according to the probability of existence of the object, which in turn depends on the number of perception cycles of the object concerned (for instance, the number of measurements that can be associated with an object in the database).

The maximum number of dynamic and static objects inside the EPM is given by the following upper limits:
DYN_OBJ_MAX maximum number of dynamic objects in the EPM
STAT_OBJ_MAX maximum number of static objects in the EPM The description of dynamic objects can be described using two different reference frameworks:
the local reference framework of the sending transportation vehicle: when using sensor raw data, the local coordinates system of the sending transportation vehicle is used for describing the dynamic attributes of the perceived object;
the global reference framework: alternatively, the description can be made in a global reference, as specified in ETSI TS 102 894-2.

A classification of the sending ITS station can be provided in addition to the dynamic attributes of the object. This classification is based on a proposal given in ETSI TS 102 894-2, V1.2.1 (DE Station Type).

The description of static objects can use the same reference framework as was used for the description of the dynamic objects. Instead of transmitting the expected geometric shape of the static object, an occupancy grid of a detection area can be used.

LIST OF REFERENCES 100 method for characterizing objects to be identified
110 acquiring sensor data
120 determining an object
130 selecting sensor information
140 characterizing
210 local sensors having sensor raw data
220 sensor information from remote sensors
310 objects to be identified
320 associated sensor data
330 associated sensor data
340 fused sensor data
350 additional information on the objects
400 data field
410 header
420 description field
430 dynamic object container
432 dynamic object
434 dynamic object
440 static object container
442 static object
444 static object
500 device
510 sensor-data acquisition components
512 first source
514 second source
516 second source
520 determination components
522 association matrix
524 fused objects
526 sensor information from the first source
530 selection components
540 interfaces
600 device
610 sensor-data acquisition components
612 first source
614 second source
616 second source
620 sensor raw data database
626 sensor information from the first source
630 common data format
640 object relativization
650 object data pool/database
660 modular environmental representation framework
662 association matrix
664 objects
670 data fusion
680 interface
682 associated sensor raw data
684 fused object data
700a range of the local sensors
700b additional V2X reception
700c additional reception of local sensor data via V2X
710 ego transportation vehicle having local sensors
720 transportation vehicle detected by the local sensors of the ego transportation vehicle
730 V2X sending transportation vehicle
740 transportation vehicle detected with V2X using collective perception

The invention claimed is:

1. A method for characterizing objects to be identified, the method comprising:
acquiring, by a transportation vehicle, sensor data constituting sensor raw data from a first source of sensor information and a second source of sensor information, wherein the first source is a local sensor of the transportation vehicle and the second source is a remote sensor outside the transportation vehicle, and wherein the second source sensor data is acquired via a message including a data field, the data field comprising a description field, a dynamic object container including a description of at least one dynamic object detected by the second source, and a static object container including a description of at least one static object detected by the second source;
determining at least one object to be identified based on the sensor data;
selecting that sensor information from the first source that is associated with the object to be identified and is representative of sensor raw data modified in a course of object recognition to convert the sensor data to a common data format and/or localize the sensor data in a coordinate system; and
characterizing the object to be identified by combining the acquired sensor data and the selected sensor information.

2. The method of claim 1, wherein the second source of sensor information provides sensor messages via an interface, wherein the local sensor detects the environment of the transportation vehicle, and the remote sensor detects the status of at least one additional transportation vehicle and/or detects the environment of the at least one additional transportation vehicle, and/or provides status detection as a Cooperative Awareness Message (CAM) and/or as a Decentralized Environmental Notification Message (DENM).

3. The method of claim 1, wherein determining the object to be identified is also based on fused data in addition to the sensor data associated with the identified object, which fused data is based on a combination of sensor raw data from a multiplicity of sensors.

4. The method of claim 1, wherein additional information defining a probability of existence and/or a duration of existence of the object is provided with the identified objects.

5. The method of claim 1, wherein
the description field comprises an identifier of the transportation vehicle and/or a position of the transportation vehicle and/or a distance of the transportation vehicle and/or a speed of the transportation vehicle and/or an acceleration of the transportation vehicle and/or at least one property of the local sensors of the transportation vehicle.

6. The method of claim 5, wherein the at least one dynamic object comprises sensor information from the first source and/or localization information, which contains a local or a global reference value, and/or dynamics information for describing the dynamic object dynamics and/or a classification of the dynamic object and/or an estimated geometric dimension of the dynamic object; and/or wherein the at least one static object comprises sensor information from the first source and/or localization information and/or a classification of the static object and/or an estimated geometric dimension of the static object or an occupancy grid of a detection area.

7. The method of claim 1, wherein the transportation vehicle is a first transportation vehicle, wherein the message including the data field is received via a mobile network from a second transportation vehicle, wherein
the description field of the data field comprises an identifier of the second transportation vehicle and a position of the second transportation vehicle and a distance of the second transportation vehicle and a speed of the second transportation vehicle and an acceleration of the second transportation vehicle and at least one property of the local sensors of the second transportation vehicle,
wherein the dynamic object container which comprises the description of at least one dynamic object detected by the second transportation vehicle,
wherein the static object container comprises the description of at least one static object detected by the second transportation vehicle, wherein the dynamic object comprises: sensor information from the second source and localization information, which contains a local or a global reference value, and dynamics information for describing the dynamic object dynamics and a classification of the dynamic object and an estimated geometric dimension of the dynamic object; and wherein the static object comprises sensor information from the second source and localization information and a classification of the static object and an occupancy grid.

8. A device of a transportation vehicle for characterizing objects to be identified, the device comprising:
sensor-data acquisition components for acquiring raw sensor data comprising a first source of sensor information and a second source of sensor information, wherein the first source is a local sensor of the transportation vehicle and the second source is a remote sensor outside the transportation vehicle, and wherein the second source sensor data is acquired via a message including a data field, the data field comprising a description field, a dynamic object container including a description of at least one dynamic object detected by the second source, and a static object container including a description of at least one static object detected by the second source;
determination components for determining at least one object to be identified based on the sensor data;
selection components for selecting that sensor information from the first source that is associated with the object to be identified and is representative of sensor raw data modified in a course of object recognition to convert the sensor data to a common data format and/or localize the sensor data in a coordinate system; and
interfaces for providing information about the object to be identified by combining the acquired sensor data and the selected sensor information.

9. The device of claim 8, wherein the selection components comprise a first database for storing the sensor raw data and/or a second database for storing the information about the objects to be identified.

10. The device of claim 8, wherein the second source provides sensor messages via an interface, wherein the local sensor detects the environment of the transportation vehicle, and the remote sensor detects the status of at least one additional transportation vehicle and/or detects the environment of the at least one additional transportation vehicle, and/or provides status detection as a Cooperative Awareness Message (CAM) and/or as a Decentralized Environmental Notification Message (DENM).

11. The device of claim 8, wherein determination of the object to be identified is also based on fused data in addition to the sensor data associated with the identified object, which fused data is based on a combination of sensor raw data from a multiplicity of sensors.

12. The device of claim 8, wherein additional information defining a probability of existence and/or a duration of existence of the object is provided with the identified objects.

13. A transportation vehicle having a device for characterizing objects to be identified, the device comprising:
sensor-data acquisition components for acquiring sensor data constituting sensor raw data and comprising a first source of sensor information and a second source of sensor information, wherein the first source is a local sensor of the transportation vehicle and the second source is a remote sensor outside the transportation vehicle, and wherein the second source sensor data is acquired via a message including a data field, the data field comprising a description field, a dynamic object container including a description of at least one dynamic object detected by the second source, and a static object container including a description of at least one static object detected by the second source;
determination components for determining at least one object to be identified based on the sensor data;
selection components for selecting that sensor information from the first source that is associated with the object to be identified and is representative of sensor raw data modified in a course of object recognition to convert the sensor data to a common data format and/or localize the sensor data in a coordinate system; and
interfaces for providing information about the object to be by combining the acquired sensor data and the selected sensor information.

14. The transportation vehicle of claim 13, wherein the selection components comprise a first database for storing the sensor raw data and/or a second database for storing the information about the objects to be identified.

15. The transportation vehicle of claim 13, wherein the second source provides sensor messages via an interface, wherein the local sensor detects the environment of the transportation vehicle, and the remote sensor detects the status of at least one additional transportation vehicle and/or detects the environment of the at least one additional transportation vehicle, and/or provides status detection as a Cooperative Awareness Message (CAM) and/or as a Decentralized Environmental Notification Message (DENM).

16. The transportation vehicle of claim 13, wherein determination of the object to be identified is also based on fused data in addition to the sensor data associated with the identified object, which fused data is based on a combination of sensor raw data from a multiplicity of sensors.

17. The transportation vehicle of claim 13, wherein additional information defining a probability of existence and/or a duration of existence of the object is provided with the identified objects.

* * * * *